US011886921B2

United States Patent
Regge et al.

(10) Patent No.: US 11,886,921 B2
(45) Date of Patent: Jan. 30, 2024

(54) SERVERLESS RUNTIME CONTAINER ALLOCATION

(71) Applicant: INTERNATIONAL BUSINESS MACHINES CORPORATION, Armonk, NY (US)

(72) Inventors: Enrico Regge, Stuttgart (DE); Michael Beck, Bad Teinach-Zavelste (DE); Werner Schuetz, Nufringen (DE); Peter Gerstl, Holzgerlingen (DE); Simon Daniel Moser, Gärtringen (DE); Joerg Erdmenger, Waldenbuch (DE)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 17/249,544

(22) Filed: Mar. 4, 2021

(65) Prior Publication Data

US 2022/0283858 A1 Sep. 8, 2022

(51) Int. Cl.
*G06F 9/50* (2006.01)
*G06N 20/00* (2019.01)

(52) U.S. Cl.
CPC ............ *G06F 9/505* (2013.01); *G06N 20/00* (2019.01)

(58) Field of Classification Search
None
See application file for complete search history.

(56) References Cited

U.S. PATENT DOCUMENTS

RE42,726 E    9/2011   Keshav
9,009,294 B2  4/2015   Dawson
              (Continued)

FOREIGN PATENT DOCUMENTS

CN    102427475 B    1/2014
EP      0405724 A2   1/1991

OTHER PUBLICATIONS

Notification of Transmittal of the International Search Report and the Written Opinion of the International Searching Authority, or the Declaration; dated Jun. 3, 2022; International Application No. PCT/EP2022/054347; Filing Date Feb. 22, 2022; 14 pages.

(Continued)

*Primary Examiner* — Van H Nguyen
(74) *Attorney, Agent, or Firm* — Schmeiser, Olsen & Watts, LLP; Edward Wixted

(57) ABSTRACT

A method, system, and computer program product for implementing automated serverless runtime container allocation is provided. The method includes defining a number of runtime containers and associated characteristics required for each worker node of a plurality of worker nodes for execution of a specified workload. The specified workload is dispatched to the plurality of worker nodes and a specified portion of the specified workload is assigned to each worker node. An application executing a universal runtime container that includes potential application runtimes and associated supported software versions within a layered modifiable format is generated and unused layers are removed from the universal runtime container. The specified workload is executed via the universal runtime container and a set of available universal runtime containers is refilled on an associated work node.

20 Claims, 10 Drawing Sheets

(56) References Cited

U.S. PATENT DOCUMENTS

| | | | |
|---|---|---|---|
| 9,405,585 B2* | 8/2016 | Chess | G06Q 10/06316 |
| 10,824,474 B1* | 11/2020 | Kamboj | G06F 9/5038 |
| 11,030,016 B2* | 6/2021 | Banerjee | G06F 9/5072 |
| 11,263,107 B2* | 3/2022 | Nasu | G06F 9/5022 |
| 11,392,422 B1* | 7/2022 | Filiz | G06F 9/45558 |
| 11,403,154 B1* | 8/2022 | Agarwal | G06F 9/5005 |
| 11,422,844 B1* | 8/2022 | Filiz | G06F 9/45558 |
| 11,748,162 B2* | 9/2023 | Fong | G06F 9/5077 718/1 |
| 11,748,178 B2* | 9/2023 | Bachmutsky | G06F 8/44 719/312 |
| 2007/0180453 A1* | 8/2007 | Burr | G06F 9/5027 718/105 |
| 2018/0365055 A1 | 12/2018 | Bhimani | |
| 2020/0026562 A1 | 1/2020 | Bahramshahry | |
| 2020/0081745 A1 | 3/2020 | Cybulski | |
| 2020/0356406 A1 | 11/2020 | Mohan | |
| 2021/0097477 A1* | 4/2021 | Zhang | G06Q 10/08 |

OTHER PUBLICATIONS

Oakes, Edwars et al: "Sock: Rapid Task Provicioning with Serverless-Optimized Containers"; 2018 USENIX Annual Technical Conference; Jul. 9-13, 2018; pp. 57-69.

Stenborn, Oliver, "Refunction: Eliminating Serverless Cold Starts Through Container Reuse"; MEng Individual Project, Department of Computing, Imperial College London, Jun. 2019; 62 pages.

Mell, Peter et al.; "The NIST Definition of Cloud Computing;" National Institute of Standards and Technology; Special Publication 800-145; Sep. 2011; 7 pages.

Abad, Christina L. et al.; Package-Aware Scheduling of FaaS Functions; ICPE '18: Companion of the 2018 ACM/SPEC International Conference on Performance Engineering; Apr. 2018; pp. 101-106.

Aumala, Gabriel et al; Beyond Load Balancing: Package-Aware Scheduling for Serverless Platforms; 1019 19th IEEE/ACM International Symposium on Cluster, Cloud and Grid Computing; May 2019; 11 pages.

AWS Lambda Data Processing; https://asw.amazon.com/de/lamdba/; retrieved from the Internet Mar. 2, 2021; 13 pages.

Azure Functions; https://azure.microsoft.com/en-us/services/functions/; retrieved from the Internet Mar. 2, 2021; 21 pages.

Behrendt, Michael et al.; Serverless for Highly Parallel Workloads with IBM Cloud Functions; https://www.ibm.com/cloud/blog/serverless-for-highly-parallel-workloads-with-ibm-cloud-functions; May 7, 2019; 10 pages.

Cloud Functions: Google Cloud; https://cloud.google.com/functions; retrieved from the Internet Mar. 2, 2021; 20 pages.

IBM Cloud Functions; https://www.ibm.com/cloud/functions; retrieved from the Internet Mar. 2, 2021; 10 pages.

Open Source Serverless Cloud Platform: Apache OpenWhisk; https://openwhisk.apache.org/; retrieved from the Internet Mar. 2, 2021; 5 pages.

Open Source, Kubernetes—native Serverless Framework; https://fission.io/: fission; retrieved from the Internet Mar. 2, 2021; 6 pages.

Suresh, Amoghvarsha et al; FnSched: An Efficient Scheduler for Serverless Functions; WOSC'19: Proceedings of the 5th International Workshop on Serverless Computing; Dec. 2019; 6 pages.

Van Eyk, Erwin; Going FaaSter: Cost-Performance-Optimizations of Servlerless on Kubernetes; Serverless Architecture Conference; Aug. 2019; 8 pages.

* cited by examiner

SERVERLESS RUNTIME CONTAINER ALLOCATION

BACKGROUND

The present invention relates generally to a method for automatically generating a serverless runtime container and in particular to a method and associated system for improving runtime container software technology associated with generating an application executing a universal runtime container including potential application runtimes and associated supported software versions within a layered modifiable format and executing a specified workload via the universal runtime container. Typical serverless environments require verification that a provided hardware/software capacity is sufficient for processing highly elastic workloads being scheduled without notice to customers of a system. Likewise, a provider may be required to ensure that operational costs fall within a predetermined threshold. An overprovisioned system drive operational costs to exceed an upper level threshold. The method and associated system of the present invention is configured to addresses several modifications for improving a serverless system with respect to balance operational costs and system performance.

SUMMARY

A first aspect of the invention provides a serverless runtime container generation method comprising: defining, by a processor of a centralized maintenance device, a number of runtime containers and associated characteristics required for each worker node of a plurality of worker nodes for execution of a specified workload; dispatching, by the processor via a plurality of coordinated controllers, the specified workload to the plurality of worker nodes; assigning, by the processor via the plurality of coordinated controllers, a specified portion of the specified workload to each the worker node; generating, by the processor based on results of the assigning, an application executing a universal runtime container comprising a plurality of potential application runtimes and associated supported software versions within a layered modifiable format comprising a plurality of layers; removing, by the processor executing a refill agent component, unused layers of the plurality of layers of the universal runtime container; executing, by the processor in response to the generating the universal runtime container, the specified workload via the universal runtime container; and refilling, by the processor via the plurality of coordinated controllers in response to the executing, a set of available universal runtime containers on an associated worker node of the plurality of work nodes.

Some embodiments of the invention further provide a process for determining that each worker node includes a specified number of hardware and software resources for enabling the universal runtime container; negotiating a workload capacity between the plurality of coordinated controllers; and determining if each container of the set of said available universal runtime containers comprises an initialized container or a disabled container configured for initialization. These embodiments advantageously provide an effective means for generating and allocating specific, pre-build runtime containers comprising universal runtime containers; generating a centralized maintenance mechanism including a refiller component; and generating a dispatching mechanism for enabling improved capacity utilization.

A second aspect of the invention provides a computer program product, comprising a computer readable hardware storage device storing a computer readable program code, the computer readable program code comprising an algorithm that when executed by a processor of a centralized maintenance device implements a serverless runtime container generation method, the method comprising: defining, by the processor, a number of runtime containers and associated characteristics required for each worker node of a plurality of worker nodes for execution of a specified workload; dispatching, by the processor via a plurality of coordinated controllers, the specified workload to the plurality of worker nodes; assigning, by the processor via the plurality of coordinated controllers, a specified portion of the specified workload to each the worker node; generating, by the processor based on results of the assigning, an application executing a universal runtime container comprising a plurality of potential application runtimes and associated supported software versions within a layered modifiable format comprising a plurality of layers; removing, by the processor executing a refill agent component, unused layers of the plurality of layers of the universal runtime container; executing, by the processor in response to the generating the universal runtime container, the specified workload via the universal runtime container; and refilling, by the processor via the plurality of coordinated controllers in response to the executing, a set of available universal runtime containers on an associated worker node of the plurality of work nodes.

Some embodiments of the invention further provide a process for determining that each worker node includes a specified number of hardware and software resources for enabling the universal runtime container; negotiating a workload capacity between the plurality of coordinated controllers; and determining if each container of the set of said available universal runtime containers comprises an initialized container or a disabled container configured for initialization. These embodiments advantageously provide an effective means for generating and allocating specific, pre-build runtime containers comprising universal runtime containers; generating a centralized maintenance mechanism including a refiller component; and generating a dispatching mechanism for enabling improved capacity utilization.

A third aspect of the invention provides a centralized maintenance device comprising a processor coupled to a computer-readable memory unit, the memory unit comprising instructions that when executed by the processor implements a serverless runtime container generation method comprising: defining, by the processor, a number of runtime containers and associated characteristics required for each worker node of a plurality of worker nodes for execution of a specified workload; dispatching, by the processor via a plurality of coordinated controllers, the specified workload to the plurality of worker nodes; assigning, by the processor via the plurality of coordinated controllers, a specified portion of the specified workload to each the worker node; generating, by the processor based on results of the assigning, an application executing a universal runtime container comprising a plurality of potential application runtimes and associated supported software versions within a layered modifiable format comprising a plurality of layers; removing, by the processor executing a refill agent component, unused layers of the plurality of layers of the universal runtime container; executing, by the processor in response to the generating the universal runtime container, the specified workload via the universal runtime container; and refilling, by the processor via the plurality of coordinated controllers in response to the executing, a set of available universal runtime containers on an associated worker node of the plurality of work nodes.

Some embodiments of the invention further provide a process for determining that each worker node includes a specified number of hardware and software resources for enabling the universal runtime container; negotiating a workload capacity between the plurality of coordinated controllers; and determining if each container of the set of said available universal runtime containers comprises an initialized container or a disabled container configured for initialization. These embodiments advantageously provide an effective means for generating and allocating specific, pre-build runtime containers comprising universal runtime containers; generating a centralized maintenance mechanism including a refiller component; and generating a dispatching mechanism for enabling improved capacity utilization.

The present invention advantageously provides a simple method and associated system capable of automatically generating an application executing a serverless runtime container.

DETAILED DESCRIPTION

Figure 1:
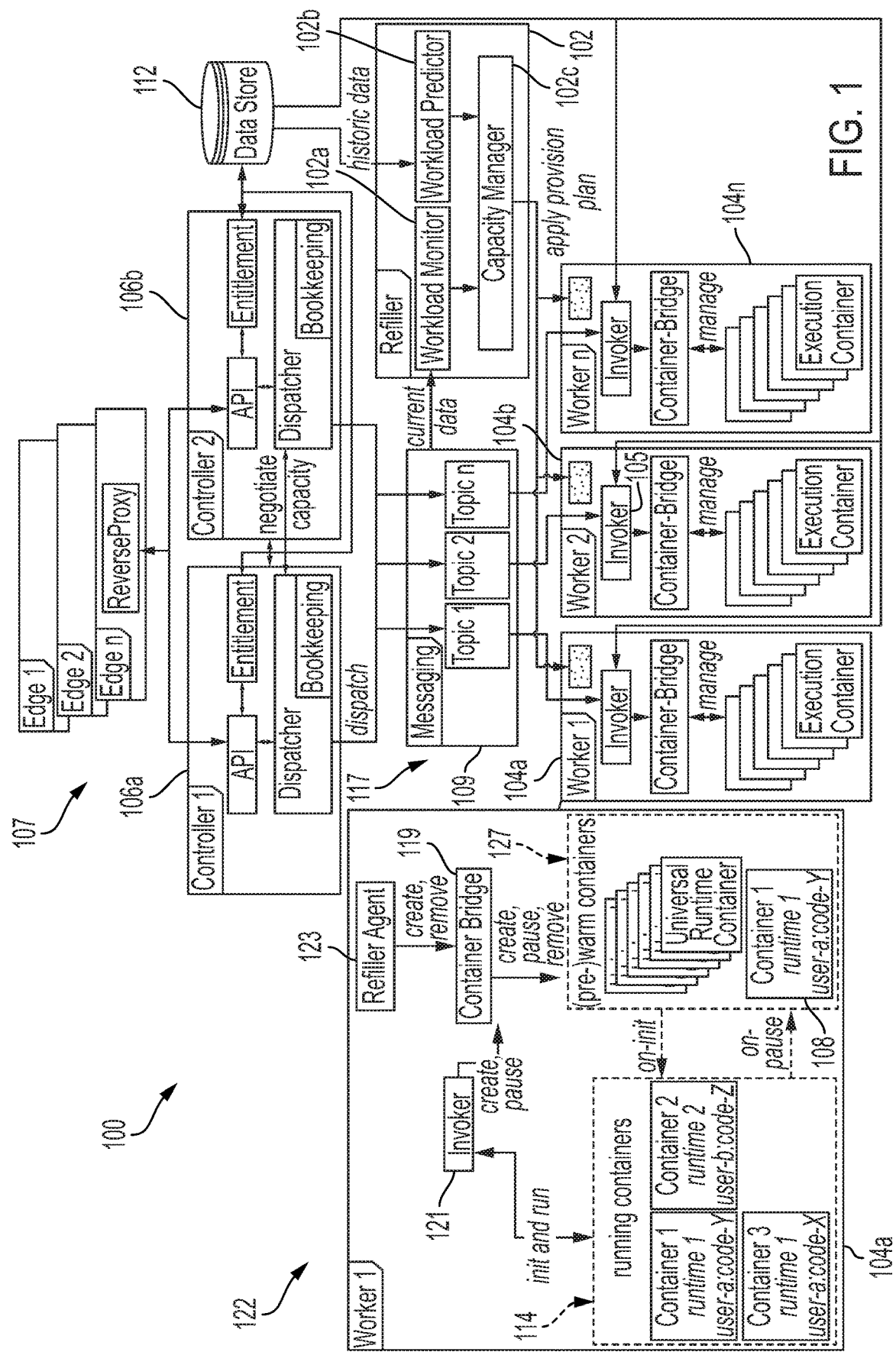
FIG. 1 illustrates a system for improving runtime container software technology associated with generating an application executing a universal runtime container including potential application runtimes and associated supported software versions within a layered modifiable format and executing a specified workload via the universal runtime container, in accordance with embodiments of the present invention.

FIG. 1 illustrates a system 100 for improving runtime container software technology associated with generating an (software) application executing a universal runtime container including potential application runtimes and associated supported software versions within a layered modifiable format and executing a specified workload via the universal runtime container, in accordance with embodiments of the present invention. In typical serverless environments, a system provider may be required to verify that a provided hardware/software capacity (e.g., of memory, CPU, etc.) is sufficient for processing highly elastic workloads being scheduled without notice to customers of a system. Likewise, a provider may be required to ensure that operational costs fall within a predetermined threshold. An over-provisioned system drive operational costs to exceed an upper level threshold. Likewise, a system configured to operate with minimal hardware may not be able to process a required workload at all thereby compelling a cloud provider to balance operational costs and system performance. System 100 is configured to addresses several modifications for improving a serverless system with respect to balance operational costs and system performance. Serverless system improvements may include:

1. Generating and allocating specific, pre-build runtime containers comprising universal runtime containers.
2. Generating a centralized maintenance mechanism including a refiller component.
3. Generating a dispatching mechanism for enabling improved capacity utilization.

System 100 of FIG. 1 includes edge servers 107, controllers 106a and 106b, data store 112, messaging component 109, refiller component 102, and worker nodes 104a . . . 104n interconnected through a network 117. Refiller component 102 comprises hardware/software components configured to maintain a workload provisioning plan defining a number of runtime containers needed for each workload. The hardware/software components of refiller component 102 comprise a workload monitor component 102a, a workload protector component 102b, and a capacity manager component 102c. Refiller component 102 is configured to create and apply a provisioning plan rolled-out to all worker nodes 104a . . . 104n. The provisioning plan consists of types and number of containers that each specified worker node should maintain within its pre-warm pool. Consuming topics of a message engine enables refiller component 102 to determine which requests are currently waiting for execution via a worker node. A second source of data is pulled from data store 112. Datastore 112 contains information regarding previously executed workloads. Capacity manager component 102c uses all data sources to create a provisioning plan for each individual worker node.

Worker nodes 104a . . . 104n are configured to execute submitted workloads.

Worker nodes 104a . . . 104n (e.g., as illustrated in the expanded view 122 of worker node 104a) each comprise a container bridge 119 (i.e., for spawning & managing a runtime container 108), actual running containers 114, an invoker component 121, a refiller agent 123 (i.e., an agent that listens to refiller component 102 and executes refilling requests issued by a central refiller), and universal runtime containers 127. Refiller component 102, controllers 106a and 106b, and worker nodes 104a . . . 104n each include specialized circuitry (that may include specialized software), sensors, and a machine learning software code/hardware structure (i.e., including machine learning software code). Sensors may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Refiller component 102, controllers 106a and 106b, and worker nodes 104a . . . 104n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, refiller component 102, controllers 106a and 106b, and worker nodes 104a . . . 104n may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving runtime container software technology associated with generating a universal runtime container including potential application runtimes and associated supported software versions within a layered modifiable format and executing a specified workload via the universal runtime container. Network 117 may include any type of network including, inter alia, a 5G telecom network, a local area network, (LAN), a wide area network (WAN), the Internet, a wireless network, etc. Alternatively, network 117 may include an application programming interface (API).

System 100 provides improved container instantiation by using universal runtime containers instead of using specific pre-build runtime containers associated with standard programming languages. System 100 is configured to build a universal runtime container including all necessary runtimes and supported software versions. Prior to injecting a workload into a container and executing it, system 100 removes all runtime layers that are not necessary for the workload. Every runtime/version is represented as a layer within the container and is easily modified and/or removed.

System 100 reduces a number of different containers requiring pre-provisioning. Previous container systems required a differing container to be created for each supported runtime. System 100 enables a process that only requires one universal container thereby improving a flexibility of the system as a universal runtime container may be enabled for any workload. Therefore, an invoker component does not need to create individual containers based on a current demand but may use an existing universal container for any workload thereby simplifying management of containers such that only a single container requires maintenance (e.g. software updates, validation, etc.).

System 100 enables an improved container supply management process via refiller component 102 (i.e. a central refiller component) mechanism. Refiller component 102 is configured to maintain a provisioning plan that defines a number of runtime containers needed within each invoker component 121. Subsequently, system 100 communicates the provisioning plan via an agent-model to each worker node 104a . . . 104n. Likewise, refiller agents 123 apply the provisioning plan by creating or deleting containers as needed. For example, refiller agents 123 may apply the provisioning plan with respect to a size of runtime containers reduced by removing unnecessary runtimes when a workload is assigned thereby resulting in additional space being available on an associated node. A provisioning plan may indicate that a refiller agent 123 may assign a new universal container when an overall space being made available exceeds a size of the universal container.

System 100 enables an invoker component (e.g., invoker component 121) on each worker node (e.g., worker node 104a) to determine if a new runtime container must be created or if an existing runtime container may be used after consuming an upcoming workload item. The refiller component 102 may enable a transfer of responsibility from the invoker component 121 to the refiller component 102. Additionally, a creation and preparation process associated with containers may be initiated before an actual workload arrives at the invoker component.

The refiller component 102 may be further improved by adding machine learning capabilities for analyzing historical data with respect to creating a provisioning plan thereby improving a prediction of expected workload for associated actions. The improvements may result is enabling better performance with respect to:

1. Faster worker node startups.
2. Faster workload executions due to optimized cold-start performance.
3. Preparation for re-occurring workload patterns.
4. Improved resource management due to optimized hardware/software cleanup procedures.

System 100 further provides improved capacity handling with respect to dispatcher components. For example, two instances of a controller component may be enabled to dispatch incoming workloads to worker nodes based on required and available hardware/software/memory capacity. Therefore, both controllers are enabled to manage half capacity for each individual worker node thereby enabling the controllers to negotiate a ratio of capacity associated with management of the controllers. If a controller is unable to assign a new workload due to a lack of capacity, the additional controller is configured to provide the missing capacity with respect to the associated node. If the additional controller is able to provide the requested capacity, the request is approved and an associated capacity for the worker node is decreased by the requested amount. Subsequently, the (original) controller increases its overall capacity for the worker node by the requested amount and assigns the workload. Additionally, all requests and responses comprise information associated with a capacity managed by each controller. A constant exchange of associated status information is used to repair capacity management if communication synchronization issues are present.

The following example illustrates a process associated with the execution of a workload on a worker node from a placement request until a workload is executed.

The process is enabled to be executed within a cloud structure and provide pre-packaged runtime components. The process includes: enabling an invoker component to receive a workload placement request, locating a container with associated software requirements, assigning a workload to the associated container, and initializing and running the workload. The process is further detailed as follows:

The request for workload placement is received by an invoker component. The request comprises a specification associated with a required runtime or a set of runtimes. The specification comprises a declarative description of a minimum set of software components necessary for running the workload. The specification may additionally include a description of required software and respective minimum version numbers. The software may include a runtime (e.g., a JRE or Python runtime) and a set of required libraries. The specification is associated with requirements of the workload. Subsequently, the invoker component generates a request for an inactive container matching the runtime specification from the container inventory on the node. If a container meeting the specification exists, it is marked active within the inventory. Likewise, the invoker component places the workload within the container for execution. If the container inventory does not include a container associated with the workload specification, a container registry is analyzed to determine if it contains a template associated with the workload specification that may be instantiated to provide the required container. The container registry presents available container templates and associated installed software. If the container registry includes a template matching the requirements of the workload, an invoker component creates and initiates an instance of the template and places and executes the workload within the container. As a prerequisite for template instantiation, the associated node is required to have sufficient resources to fit the instantiated container. Sufficient management of container resources is described as follows:

If the container registry does not include a template meeting the requirements of the workload to be placed, a template management process is triggered for creating an appropriate container template based on the requirements of the workload. The created container template is assigned to the registry. The template management process might comprise a manual process or an automated process as follows:

1. Template requirements are verified for correctness. For example, the system may be unable to locate a template because a specification associated with a placement request contains nonexistent or incompatible version numbers.
2. Process dependencies are associated with required software and versions. For example, terms and conditions of the required software are verified to ensure that a template to be constructed matches a cloud provider's policies and contract legal terms between the cloud provider and a workload requester.
3. Requirements are verified with respect to resource limitations (hardware or software) of the cloud environment to ensure that the instantiated template is able to run workloads as expected.
4. Required software packages are downloaded and installed for template creation.
5. The template is placed into the container registry.

System 100 is configured to set up a cloud environment for workload processing such that a cloud provider may initiate a template registry comprising a set of standard templates generated based on a popularity of programming languages or as a result of a customer survey. Alternatively, a template registry might be initially configured as an empty structure and all template creation is associated with a template management process as described, supra. Initiating the process with respect to a set of standard templates may speed up a response time for early deployments.

The aforementioned description associated with container resource management results in the optimization of resource consumption such that a time period occurring between receiving a placement request and a workload is running on a container is referred to a "time-until-up" period. A fast response time may demand that containers be pre-provisioned on a node since a container initialization process may have a significant impact on the time-until-up period. A key success factor for enabling a minimal time-until-up period across workloads may include retaining an appropriate set of templates within a container registry and pre-provisioning a mix of templates that is likely to match incoming workload requirements. Incorrect decisions may additionally impact the time-until-up period negatively as additionally required steps may require remediation such as a deletion of pre-provisioned containers. For example, if a node is pre-provisioned with containers based on runtimes A, B, C and a customer initiates a request for a specified number of workloads that require runtimes D and E, containers may require swapping on the node and new containers may require instantiation which may require a greater cost than placing the workload on a container that is already pre-provisioned.

A universal container is defined herein as a container template (structure) comprising all software packages pre-installed that are required to meet the specifications of all incoming workloads. A universal container includes partitioning capability provided by a container (software/hardware) engine for enabling easy removal of unnecessary software components to free up resources for future workload placement. Software components may be determined to be incompatible such that they may be unable to co-exist within a single container. Therefore, multiple universal containers may be required.

Universal container processing may include analyzing workload requirements with respect to software present within the universal container. If a mismatch is detected, an invoker component may add required software to the universal container. Likewise, if the universal container matches workload requirements, inventory is checked for a universal container that is inactive, unnecessary software components are removed from the universal container, and a workload is placed within the container and executed. The container is marked as active in the inventory.

A universal container provides the following advantages:

Simplification of decisions associated with locating a matching container. For example, workload requirements may only be required to be matched once with respect to software present within a universal container. The matching process is only required to be performed on nodes that include at least one inactive container because all pre-provisioned inactive containers comprise instances of a universal container image. If a universal container does not meet workload requirements, it may be extended with required software during a template management process. Added software will be present for use by future workloads.

Universal containers may require more storage space than container configured to address specific workload requirements. Therefore, since a universal container is adjusted to a minimum software necessary for a workload, an overhead is only present while containers are inactive or during a time when a workload is placed and during a container size adjustment process that includes removal of unnecessary software. A refiller component may be configured to manage available space by assigning new universal containers intelligently.

Figure 2:
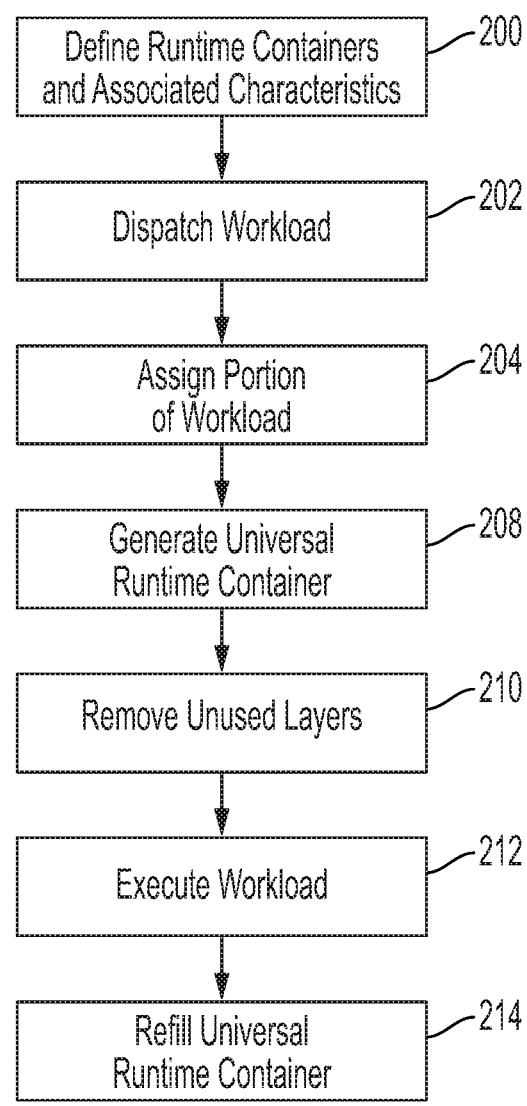
FIG. 2 illustrates an algorithm detailing a process flow enabled by the system of FIG. 1 for improving runtime container software technology associated with generating an application executing a universal runtime container including potential application runtimes and associated supported software versions within a layered modifiable format and executing a specified workload via the universal runtime container, in accordance with embodiments of the present invention.

FIG. 2 illustrates an algorithm detailing a process flow enabled by system 100 of FIG. 1 for improving runtime container software technology associated with generating an application executing a universal runtime container including potential application runtimes and associated supported software versions within a layered modifiable format and executing a specified workload via the universal runtime container, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by edge servers 107, controllers 106a and 106b, messaging component 109, refiller component 102, and worker nodes 104a . . . 104n of FIG. 1. In step 200, a number of runtime containers and associated characteristics required for each worker node of a plurality of worker nodes are defined (by a centralized maintenance device) for execution of a specified workload. In step 202, the specified workload is dispatched to the plurality of worker nodes via coordinated controllers. Likewise, a workload capacity between the coordinated controllers may be negotiated and the dispatching process may be executed based on results of the negotiation. The dispatching process may be is executed based on a hardware and software capacity of the coordinated controllers.

In step 204, a specified portion of the specified workload is assigned to each worker node via the coordinated controllers. In step 208, an application executing a universal runtime container is generated based on results of step 204. The universal runtime container comprises potential application runtimes and associated supported software versions within a layered modifiable format including a plurality of layers. Additionally, it may be determined that each worker node comprises a specified number of hardware and software resources for enabling the universal runtime container.

In step 210, unused layers of the plurality of layers are removed via execution of a refill agent component. The removal process may further include removing application runtimes of potential application runtimes that are not required for execution of each specified portion of the specified workload. The refill agent component may include statistical processes or machine learning capabilities configured to analyze historical data associated with previous instances of executing specified workload and generating future instances of the universal runtime container.

In step 212, the specified workload is executed via the universal runtime container. In step 214, a set of available universal runtime containers on an associated worker node is refilled. Additionally, it may be determined if each container (of the set of said available universal runtime containers) comprises an initialized container or a disabled container configured for initialization.

Figure 3:
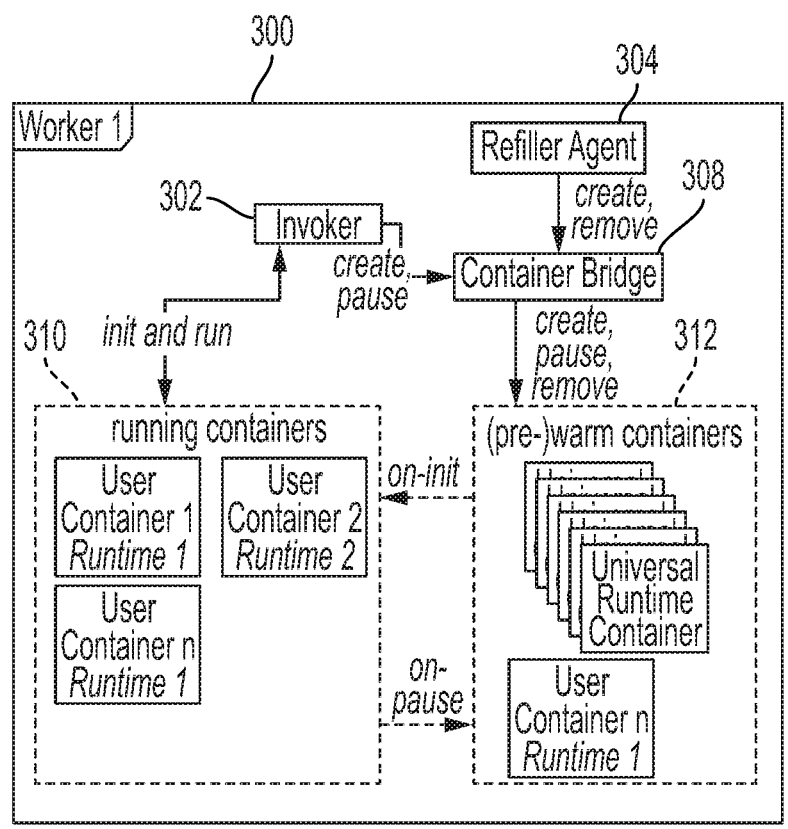
FIG. 3 illustrates an internal structural view of the machine learning software/hardware structure and/or the circuitry/software of FIG. 1, in accordance with embodiments of the present invention.

FIG. 3 illustrates a detailed view of a worker node 300 configured to execute a workload, in accordance with embodiments of the present invention. Worker node 300 comprises an invoker component 302, a refiller agent component 304, and a container bridge 308 responsible for handling all runtime-container related operations (for running containers 310 and pre-warm containers 312) such as create operations, pause operations, remove operations, etc. Invoker component 302 is configured to manage an entire lifecycle of an incoming workload and running containers 310 and pre-warm containers 312. Worker node 300 is associated with three types of workload executions: cold execution, pre-warm execution, and warm execution.

With respect to terms of performance and latency, warm executions are associated with faster operations than pre-warm and cold executions. Warm executions allow invoker component 302 to re-use a running user container for executing an incoming workload request. Likewise, a cold execution requires a new container for initialization. In order to minimize an amount of cold executions, invoker component 302 comprises has a pool of prewarmed containers that have been initialized but not yet customized for a specific customer or workload. A distribution and amount of pre-warmed containers is stored as a configuration for evaluation during invoker component startup. The configuration setting is static and may only be changed with a deployment.

Refiller agent component 304 is responsible for managing a pool of warm and pre-warm containers. Refiller agent component 304 enables a capability for pre-provisioning a specified type and number of containers based on a current need within the system. Therefore, a chance for executing a workload as a cold execution is reduced dramatically.

Refiller agent component 304 enables a process for reducing processing wait times or avoiding cold executions. The process is initiated when invoker component 302 consumes a workload and determines whether the workload is required to start a new container (cold execution) or if a (pre-)warm container is available to execute the workload. The determination may be executed before invoker component 302 receives the workload thereby avoiding cold executions as a worker node already has initiated a required container. Likewise, if refiller agent component 304 is unable to start a container right away, a wait time for the workload to be ready for execution may be reduced.

Refiller agent component 304 enables system 100 of FIG. 1 to prepare for re-occurring workloads by evaluating historical data. Refiller agent component 304 is capable of detecting a need for specific container types and based on this information, a provisioning plan is generated for initiating required containers before an actual workload is executed by an associated worker node. Therefore, system 100 (of FIG. 1) is able to respond in a timely manner without dealing with cold executions. Refiller agent component 304 may additionally detect sequences of detected workloads executed in the past. In this case, refiller agent component 304 may additionally provision needed containers before an actual workload arrives at a worker node. Usage of historic data allows refiller agent component 304 to enables the system to predict a type and amount of incoming workload. Refiller agent component 304 provides a plug-able prediction capability that may hook up simple statistics modules as well as advanced model-based prediction systems thereby improving a system performance by lowering a ratio of cold vs warm executions.

FIGS. 4A-4D illustrate processes for enabling improved capacity handling of dispatcher components, in accordance with embodiments of the present invention. For example, when a controller is unable to place a workload with a specified worker node due to a lack of capacity associated with a request, additional capacity from an additional controller may be assigned instead of attempting to locate another worker node for workload placement. An amount of capacity needed and a total amount of capacity currently managed may be transmitted with the request. The additional controller may verify if it is able to spare the requested amount of capacity on the particular worker node and the request is accepted or rejected based the available capacity. If the additional worker node accepts the request, it reduces its available capacity by the amount requested. An associated response presents a current amount of capacity associated with controller management.

FIGS. 4A-4D illustrate implementation examples associated with two controllers initially managing 8 GB of memory on a worker node comprising a capacity of 16 GB. Both controllers occupy the worker node with existing workloads of 6 GB each thereby leaving a remaining capacity of 2 GB for each controller.

Figure 4A:
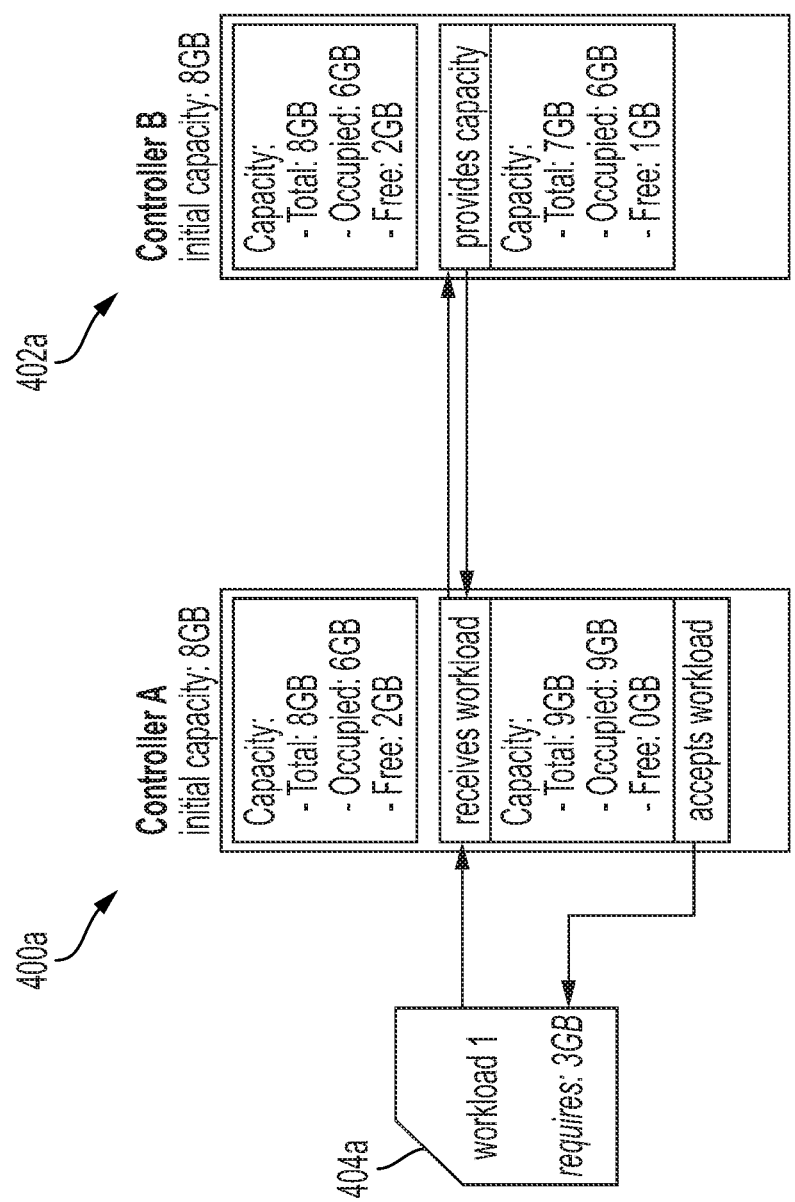
FIGS. 4A-4D illustrate processes for enabling improved capacity handling of dispatcher components, in accordance with embodiments of the present invention.

FIG. 4A illustrates a first example associated with a process resulting in a successful request to shift a workload capacity. The process is initiated when a workload 404a requiring a capacity of 3 GB is requested at a controller 400a. The controller 400a is unable to place the workload on a worker node as its remaining capacity is only 2 GB. In response, controller 400a initiates a request for an additional capacity of 1 GB from a controller 402a. Controller 402a is able to spare 1 GB of memory for the worker node and therefore accepts the request. The aforementioned process reduces a total amount of memory managed to 7 GB and an accept response is transmitted. In response to receiving the response, controller 400a increases its amount of managed capacity to 9 GB and places the workload 404a on the worker node.

Figure 4B:
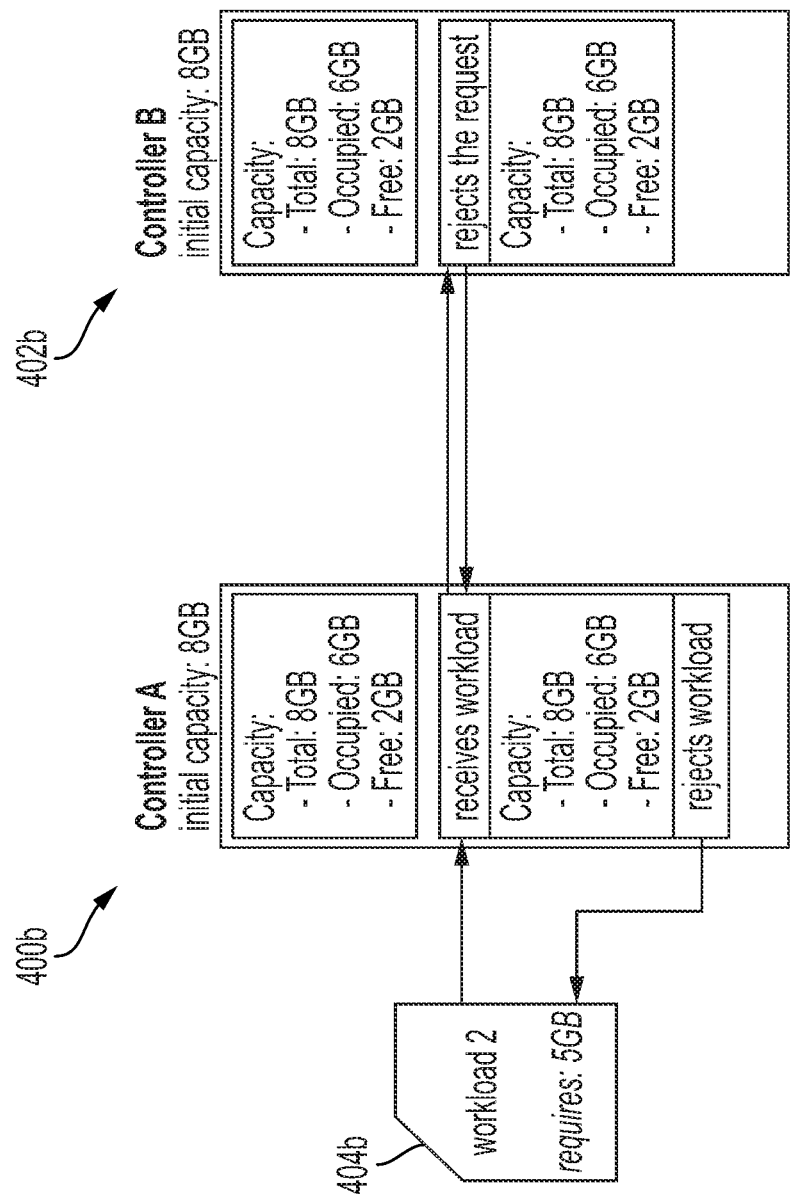

FIG. 4B illustrates a second example associated with a process resulting in an unsuccessful request to shift capacity. The process is initiated when a workload 404b requiring a capacity of 5 GB is requested at a controller 400b. The controller 400b is unable to place the workload 404b on a worker node as its remaining capacity is only 2 GB. In response, controller 400b initiates a request for an additional capacity of 3 GB from a controller 402b. Controller 402b is unable to spare 3 GB of memory for the worker node and therefore rejects the request. Likewise, controller 402b retains the total amount of memory it manages at 8 GB and transmits a reject response. In response to receiving the response, controller 400b is required to place the workload 404b on a different worker node or postpone the requested workload 404b until a capacity is available again.

Figure 4C:
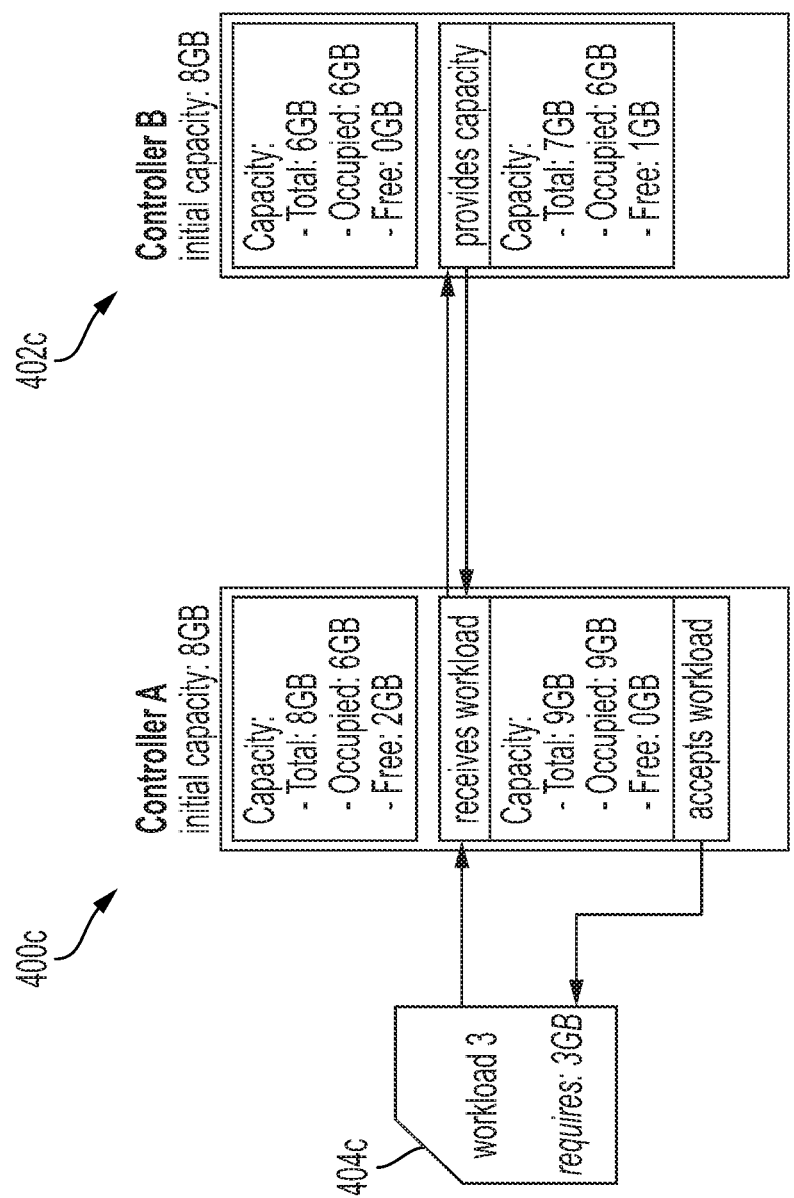

FIG. 4C illustrates a third example associated with a process resulting in a successful request to shift capacity with a self-healing result. Due to a previous miscommunication a controller 402c assumes that it currently only manages 6 GB of memory on a worker node and a workload 404c requiring a capacity of 3 GB is requested at a controller 400c. The controller 400c is unable to place the workload 404c on the worker node as its remaining capacity is only 2 GB. In response, controller 400c requests an additional capacity of 1 GB from controller 402c. Likewise, controller 400c transmits the request and additional information specifying that it currently manages a total amount of 8 GB of memory. In response, controller 402c sums up both total amounts of managed capacity and determines that there is a difference of an additional 2 GB that it adds to the amount of capacity it manages. Based on the new total capacity, controller 402c is able to spare 1 GB of memory on the worker node and therefore accepts the request. Controller 402c adjusts a total amount of memory it manages to 7 GB and transmits an accept response. In response to receiving the response, controller 400c increases its amount of managed capacity to 9 GB and places the workload 404c on the worker node.

Figure 4D:
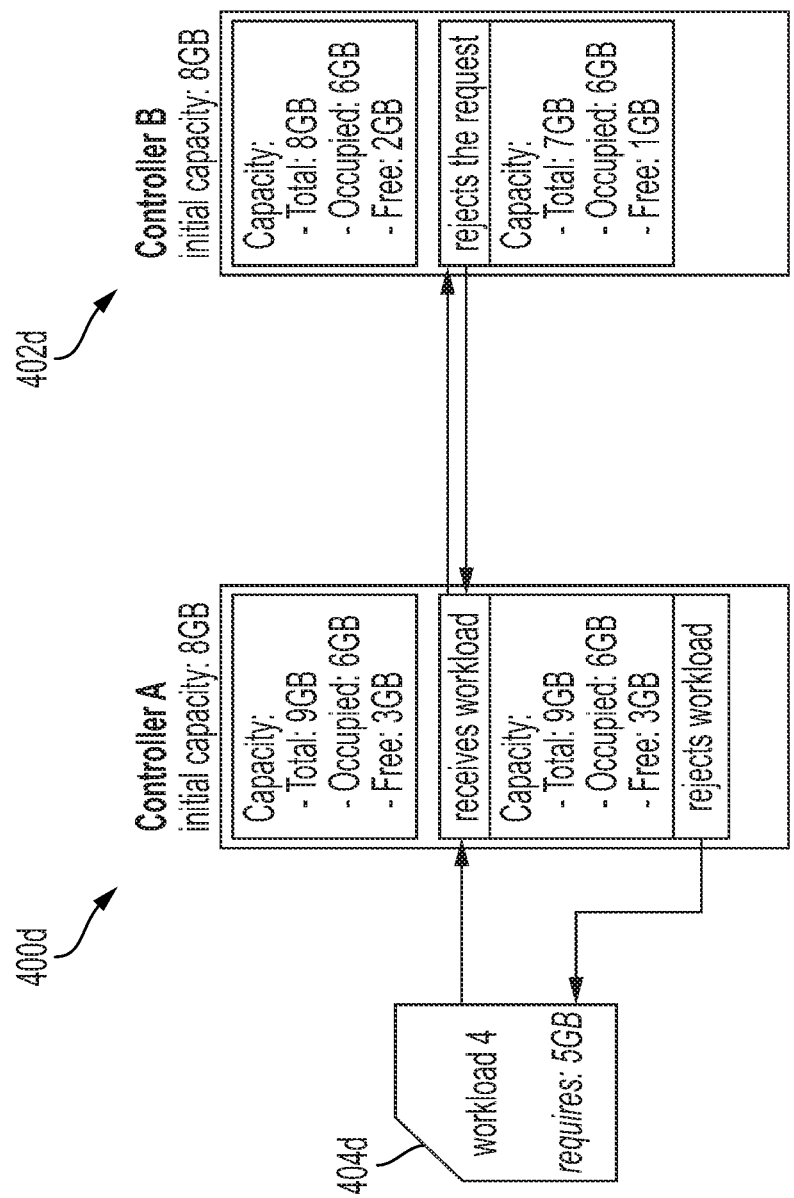

FIG. 4D illustrates a fourth example associated with a process resulting in an unsuccessful request to shift a capacity with a self-healing result. Due to a previous miscommunication, a controller 400d determines that it currently only manages 9 GB of memory on a worker node and a workload 404d requiring a capacity of 5 GB is requested at controller 400d. The controller 400d is unable to place the workload 404d on the worker node as its remaining capacity is only 3 GB. In response, controller 400d requests an additional capacity of 2 GB from a controller 402d. Likewise, controller 400d transmits the request and additional information specifying that it currently manages a total amount of 9 GB of memory. In response, controller 402d sums up both total amounts of managed capacity and determines that it lacks 1 GB of memory and therefore removes the 1 GB from the amount of capacity it manages. Controller 402d is unable to spare 2 GB of memory on the worker node and therefore rejects the request. Likewise, controller 402d adjusts a total amount of memory it manages to 7 GB and transmits a reject response. In response to receiving the response, controller 400d is required to place the workload 404d on a different worker node or postpone the requested workload 404d until the capacity is available again.

Figure 5:
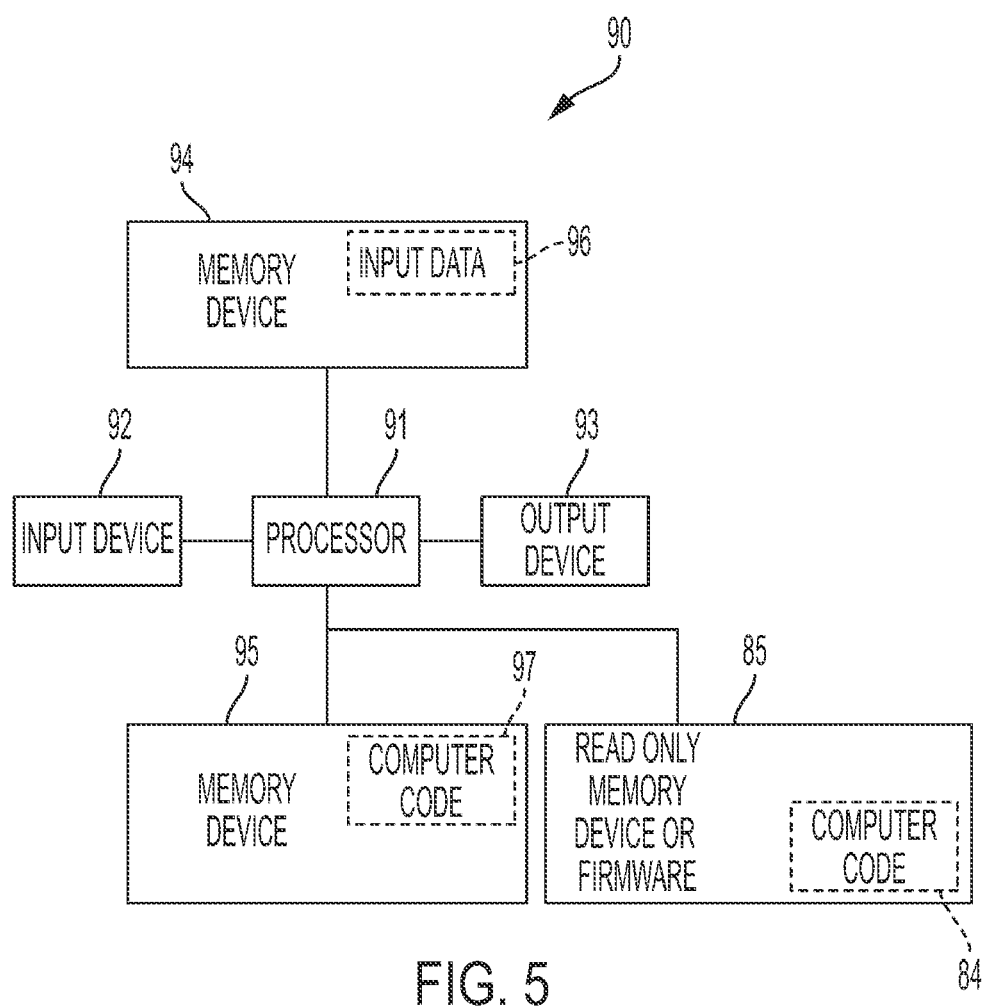
FIG. 5 illustrates a computer system used by the system of FIG. 1 for improving runtime container software technology associated with generating an application executing a universal runtime container including potential application runtimes and associated supported software versions within a layered modifiable format and executing a specified workload via the universal runtime container, in accordance with embodiments of the present invention.

FIG. 5 illustrates a computer system 90 (e.g., edge servers 107, controllers 106a and 106b, messaging component 109, refiner component 102, and worker nodes 104a . . . 104n of FIG. 1) used by or comprised by the system of FIG. 1 for improving runtime container software technology associated with generating an application executing a universal runtime container including potential application runtimes and associated supported software versions within a layered modifiable format and executing a specified workload via the universal runtime container, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving runtime container software technology associated with generating a universal runtime container including potential application runtimes and associated supported software versions within a layered modifiable format and executing a specified workload via the universal runtime container. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve runtime container software technology associated with generating a universal runtime container including potential application runtimes and associated supported software versions within a layered modifiable format and executing a specified workload via the universal runtime container. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving runtime container software technology associated with generating a universal runtime container including potential application runtimes and associated supported software versions within a layered modifiable format and executing a specified workload via the universal runtime container. In another embodiment, the invention provides a business method that performs the process steps of the invention on a subscription, advertising, and/or fee basis. That is, a service supplier, such as a Solution Integrator, could offer to enable a process for improving runtime container software technology associated with generating a universal runtime container including potential application runtimes and associated supported software versions within a layered modifiable format and executing a specified workload via the universal runtime container. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
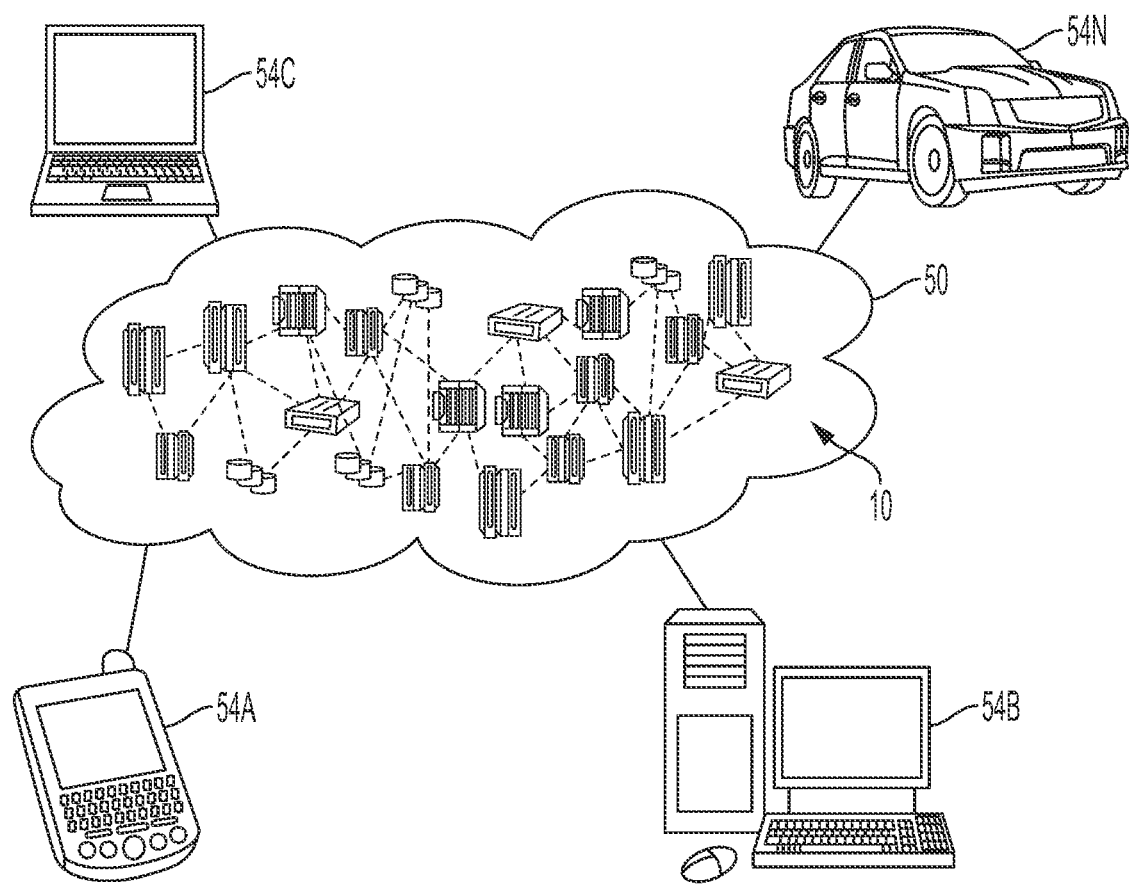
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
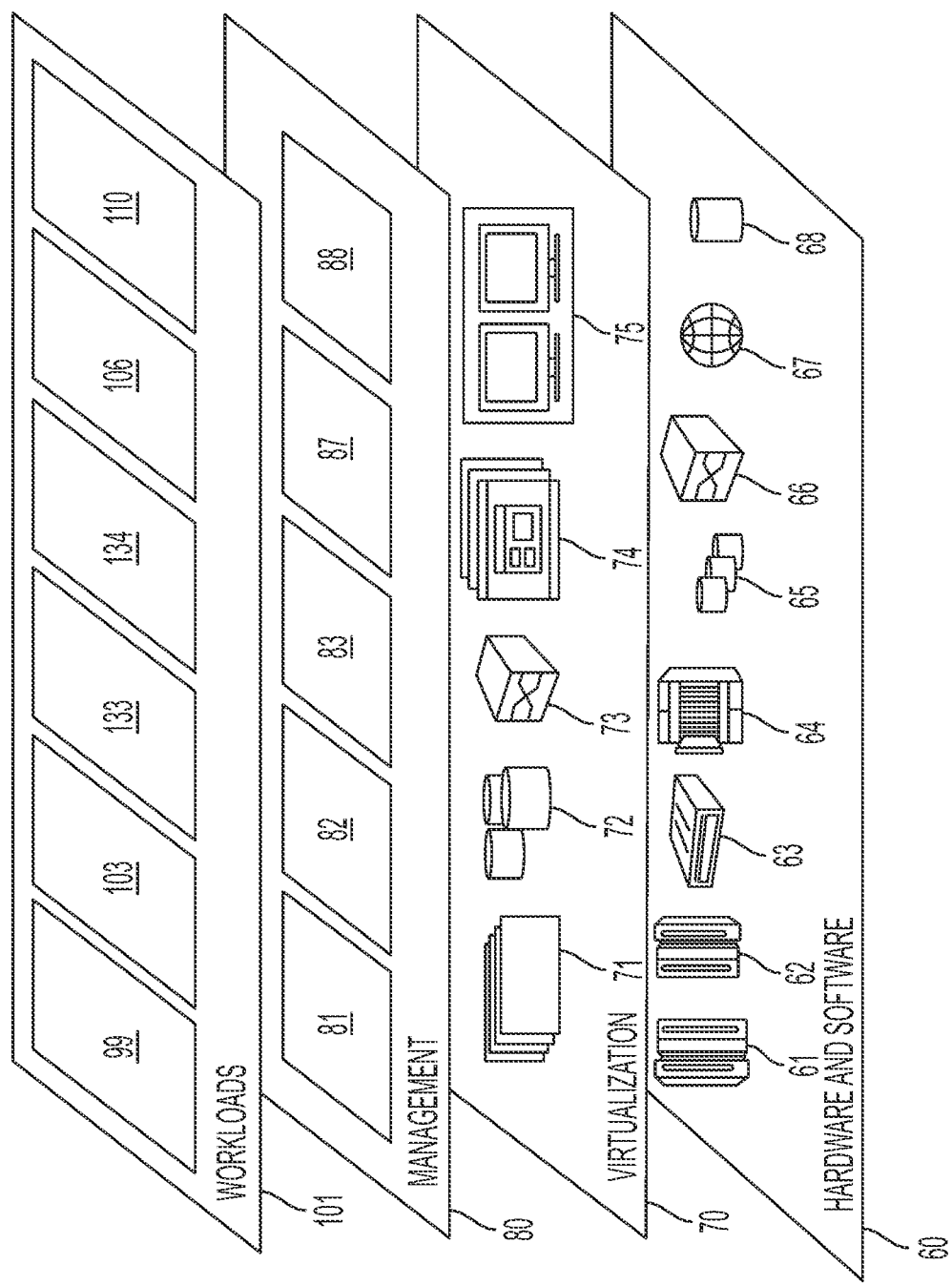
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 99; software development and lifecycle management 103; virtual classroom education delivery 133; data analytics processing 134; transaction processing 106; and improving runtime container software technology associated with generating a universal runtime container including potential application runtimes and associated supported software versions within a layered modifiable format and executing a specified workload via the universal runtime container 110.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A serverless runtime container allocation method comprising:
    defining, by a processor of a centralized maintenance device, a number of runtime containers and associated characteristics required for each worker node of a plurality of worker nodes for execution of a specified workload;
    dispatching, by said processor via a plurality of coordinated controllers, said specified workload to said plurality of worker nodes;
    assigning, by said processor via said plurality of coordinated controllers, a specified portion of said specified workload to each said worker node;
    generating, by said processor based on results of said assigning, an application executing a universal runtime container comprising a plurality of potential application runtimes and associated supported software versions within a layered modifiable format comprising a plurality of layers;
    removing, by said processor executing a refill agent component, unused layers of said plurality of layers of said universal runtime container;
    executing, by said processor in response to said generating said universal runtime container, said specified workload via said universal runtime container; and
    refilling, by said processor via said plurality of coordinated controllers in response to said executing, a set of available universal runtime containers on an associated worker node of said plurality of work nodes.

2. The method of claim 1, wherein said removing further comprises removing application runtimes of said potential application runtimes not required for execution of each specified portion of said specified workload.

3. The method of claim 1, wherein said refill agent component comprises statistical processes or machine learning capabilities configured to analyze historical data associated with previous instances of executing said specified workload and generating future instances of said universal runtime container.

4. The method of claim 1, further comprising:
    determining, by said processor, that each said worker node comprises a specified number of hardware and software resources for enabling said universal runtime container.

5. The method of claim 1, further comprising:
negotiating, by said processor, a workload capacity between said plurality of coordinated controllers, wherein said dispatching said specified workload to said plurality of worker nodes is executed based on results of said negotiating.

6. The method of claim 1, further comprising:
determining, by said processor, if each container of said set of said available universal runtime containers comprises an initialized container or a disabled container configured for initialization.

7. The method of claim 1, wherein said dispatching is executed based on a hardware and software capacity of said plurality of coordinated controllers.

8. The method of claim 1, further comprising:
providing at least one support service for at least one of creating, integrating, hosting, maintaining, and deploying computer-readable code in the server hardware device, said code being executed by the computer processor to implement: said defining, said dispatching, said assigning, said generating, said removing, said executing, and said refilling.

9. A computer program product, comprising a computer readable hardware storage device storing a computer readable program code, said computer readable program code comprising an algorithm that when executed by a processor of a centralized maintenance device implements a serverless runtime container allocation method, said method comprising:
defining, by said processor, a number of runtime containers and associated characteristics required for each worker node of a plurality of worker nodes for execution of a specified workload;
dispatching, by said processor via a plurality of coordinated controllers, said specified workload to said plurality of worker nodes;
assigning, by said processor via said plurality of coordinated controllers, a specified portion of said specified workload to each said worker node;
generating, by said processor based on results of said assigning, an application executing a universal runtime container comprising a plurality of potential application runtimes and associated supported software versions within a layered modifiable format comprising a plurality of layers;
removing, by said processor executing a refill agent component, unused layers of said plurality of layers of said universal runtime container;
executing, by said processor in response to said generating said universal runtime container, said specified workload via said universal runtime container; and
refilling, by said processor via said plurality of coordinated controllers in response to said executing, a set of available universal runtime containers on an associated worker node of said plurality of work nodes.

10. The computer program product of claim 9, wherein said removing further comprises removing application runtimes of said potential application runtimes not required for execution of each specified portion of said specified workload.

11. The computer program product of claim 9, wherein said refill agent component comprises statistical processes or machine learning capabilities configured to analyze historical data associated with previous instances of executing said specified workload and generating future instances of said universal runtime container.

12. The computer program product of claim 9, wherein said method further comprises:
determining, by said processor, that each said worker node comprises a specified number of hardware and software resources for enabling said universal runtime container.

13. The computer program product of claim 9, wherein said method further comprises:
negotiating, by said processor, a workload capacity between said plurality of coordinated controllers, wherein said dispatching said specified workload to said plurality of worker nodes is executed based on results of said negotiating.

14. The computer program product of claim 9, wherein said method further comprises:
determining, by said processor, if each container of said set of said available universal runtime containers comprises an initialized container or a disabled container configured for initialization.

15. The computer program product of claim 9, wherein said dispatching is executed based on a hardware and software capacity of said plurality of coordinated controllers.

16. A centralized maintenance device comprising a processor coupled to a computer-readable memory unit, said memory unit comprising instructions that when executed by the processor implements a serverless runtime container allocation method comprising:
defining, by said processor, a number of runtime containers and associated characteristics required for each worker node of a plurality of worker nodes for execution of a specified workload;
dispatching, by said processor via a plurality of coordinated controllers, said specified workload to said plurality of worker nodes;
assigning, by said processor via said plurality of coordinated controllers, a specified portion of said specified workload to each said worker node;
generating, by said processor based on results of said assigning, an application executing a universal runtime container comprising a plurality of potential application runtimes and associated supported software versions within a layered modifiable format comprising a plurality of layers;
removing, by said processor executing a refill agent component, unused layers of said plurality of layers of said universal runtime container;
executing, by said processor in response to said generating said universal runtime container, said specified workload via said universal runtime container; and
refilling, by said processor via said plurality of coordinated controllers in response to said executing, a set of available universal runtime containers on an associated worker node of said plurality of work nodes.

17. The server hardware device of claim 16, wherein said removing further comprises removing application runtimes of said potential application runtimes not required for execution of each specified portion of said specified workload.

18. The centralized maintenance device of claim 16, wherein said refill agent component comprises statistical processes or machine learning capabilities configured to analyze historical data associated with previous instances of executing said specified workload and generating future instances of said universal runtime container.

19. The centralized maintenance device of claim 16, wherein said method further comprises:

determining, by said processor, that each said worker node comprises a specified number of hardware and software resources for enabling said universal runtime container.

20. The centralized maintenance device of claim 16, wherein said method further comprises:
negotiating, by said processor, a workload capacity between said plurality of coordinated controllers, wherein said dispatching said specified workload to said plurality of worker nodes is executed based on results of said negotiating.

* * * * *